United States Patent [19]

Petronio et al.

[11] Patent Number: 4,850,042

[45] Date of Patent: Jul. 18, 1989

[54] DUAL MEDIA LOCAL AREA NETWORK INTERFACING

[75] Inventors: Carlo F. Petronio, Ross Township, Allegheny County; James C. Belz, Penn Hills, both of Pa.

[73] Assignee: Westinghouse Electric Corp., Pittsburgh, Pa.

[21] Appl. No.: 38,098

[22] Filed: Apr. 14, 1987

[51] Int. Cl.$^4$ ............................................. H04B 9/00
[52] U.S. Cl. .................................. 455/606; 455/601; 455/612; 370/88
[58] Field of Search ............... 455/601, 606, 607, 612, 455/617; 370/1, 88, 85

[56] References Cited

U.S. PATENT DOCUMENTS

| | | | |
|---|---|---|---|
| 4,121,217 | 5/1986 | Chen | 370/1 |
| 4,227,260 | 10/1980 | Vojvodich et al. | 455/601 |
| 4,422,179 | 12/1983 | Albanese | 455/601 |
| 4,501,021 | 2/1985 | Weiss | 370/88 |
| 4,539,679 | 9/1985 | Bux | 370/88 |
| 4,566,134 | 1/1986 | Harbour et al. | 455/607 |
| 4,587,651 | 5/1986 | Nelson et al. | 370/104 |
| 4,710,915 | 12/1987 | Kitahara | 370/88 |

FOREIGN PATENT DOCUMENTS 3534870 9/1985 Fed. Rep. of Germany .
2509935 7/1982 France .
WO85/05746 12/1985 PCT Int'l Appl. .

OTHER PUBLICATIONS

IEEE Project 802.6 on Metropolitan Area Networks, Oct. 30, 84, pp. 6, 10, 14 and 18.
Reedy, Methods of Collision Detection in Fiber Optic CSMA/CD Networks, vol. 3, No. 6, Nov., 1985.

*Primary Examiner*—Robert L. Griffin
*Assistant Examiner*—Leslie Van Beek

[57] ABSTRACT

A dual media network interface module includes an electrical network interface and an optical network interface each having a transmit port to which signals to be transmitted on the associated network are applied and a receiver port at which signals received on the network are generated. The receiver port of each interface is connected to the transmitter port of the other interface so that signals received on either network are retransmitted on the other network. Blocking circuits block the receiver signal of a LAN which is transmitting during the transmitting interval plus an interval which exceed the worst case propagation time for the associated network to prevent endless repetition of a signal. A preferred form of the module includes a pair of controller interfaces having transmit ports and receiver ports connected to the corresponding ports of the other controller interface and of the electrical and optical network interfaces to provide bidirectional communications between all devices connected to the module. The modules can be used to interface electrical and optical nodes in a network, to expand both electrical and optical networks, and to interconnect various combinations of electrical and optical local area networks.

12 Claims, 10 Drawing Sheets

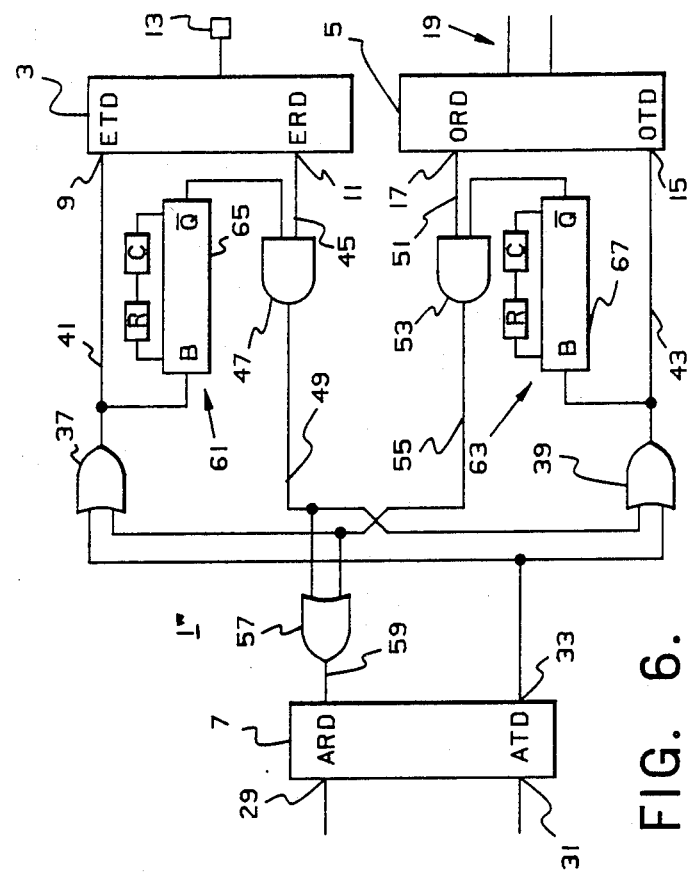
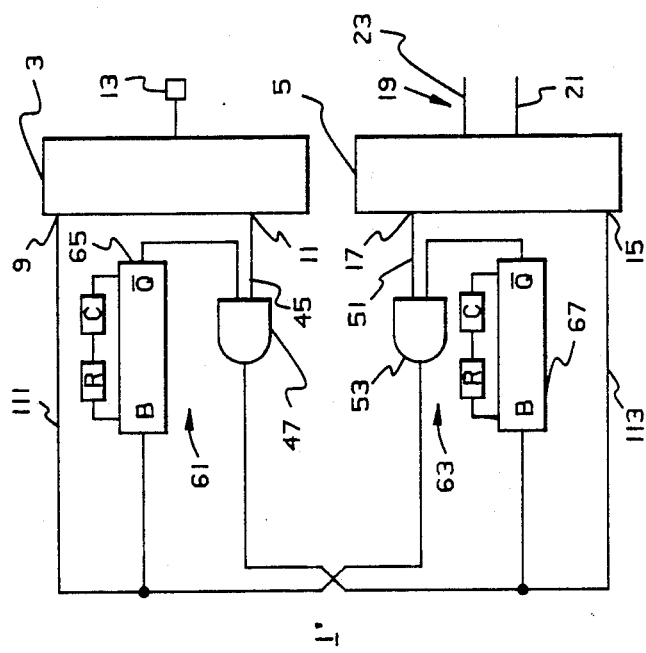
FIG. 6.
FIG. 5.

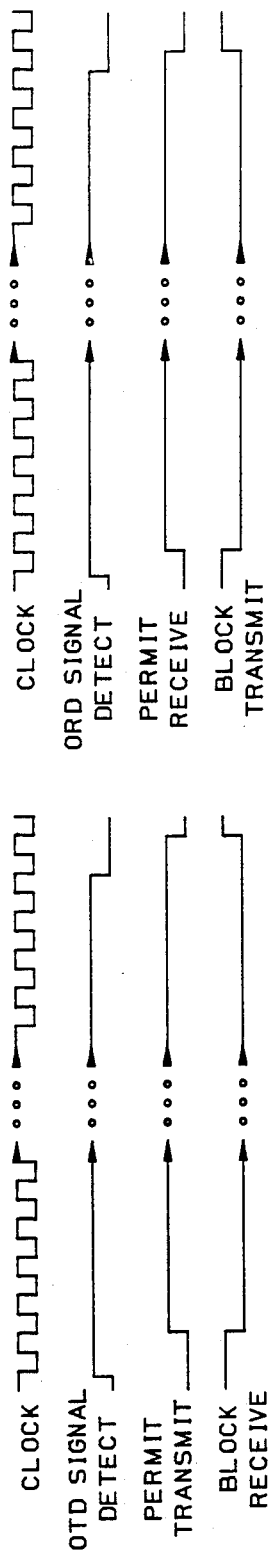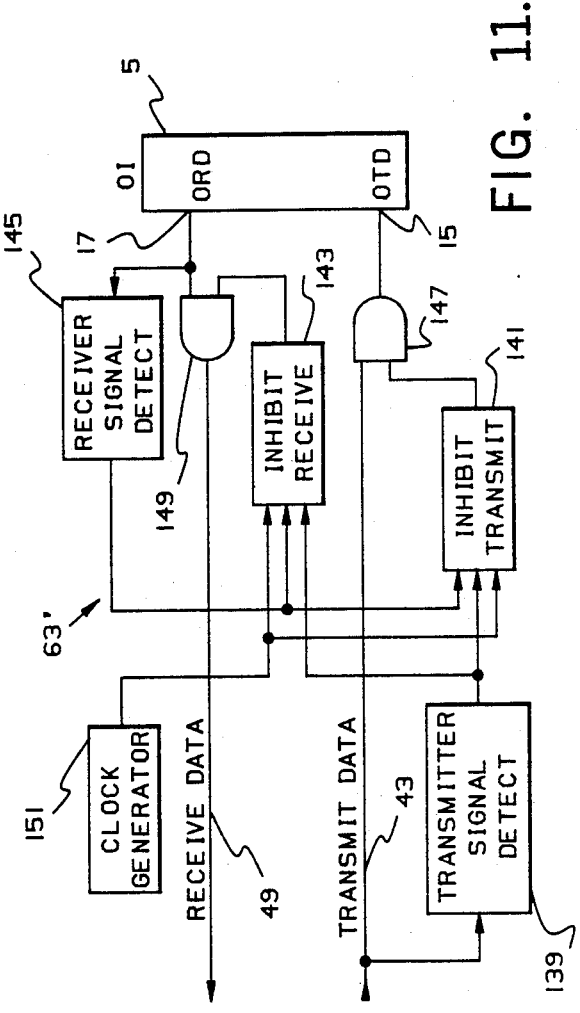
FIG. 13.
FIG. 12.
FIG. 11.

DUAL MEDIA LOCAL AREA NETWORK INTERFACING

BACKGROUND OF THE INVENTION

1. Field of the Invention

This invention is directed to interfaces between local area networks which in turn each interconnect a number of digital computers or microprocessors. More particularly it relates to interface modules which interconnect electrical and optical local area networks to each other and to their controllers, and which allow bi-directional signal transmission between all devices and channels connected to the interface while incorporating means for preventing endless repetition of signals in the system.

2. Background Information

Local area networks (LANs) are used to link a number of digital computers or microprocessors together for sharing common data, and in some instances, the division of tasks. The network includes a common data highway to which all of the computing devices are connected by controllers so that all the shared data are broadcast to all of the computers and microprocessors on the network. The data may be transmitted on the data highway in the form of electrical or optical signals. In the former case, each of the controllers is connected to a common coaxial cable. Where optical signals are used, an optical coupler device such as a transmissive star coupler, which distributes an optical signal received on any one optical fiber to all other optical fibers, forms the data highway.

Since all of the transmissions are broadcast to all of the computing devices on the network, it is necessary to provide means for precluding interference and the consequent loss of information which would result from simultaneous transmissions on the network. It is also important to establish standards so that the components of various manufacturers are compatible. Accordingly, several protocols have been established for standardizing networks. These protocols address the network on several levels in addition to the physical or hardware level, including a software level.

There are two major approaches to solving the problem of simultaneous broadcasts on a network. One approach allows the individual stations to broadcast when they have data to transmit if the network is clear. Because of propagation delays in the network, it is possible that two stations will start broadcasting almost at the same instant. Hence, once transmission is begun, the transmitting station listens for a collision with another transmission. If a collision is detected, broadcasting is terminated, and reinitiated after waiting a random interval of time. Due to the variability of optical sources and the high rate of attenuation in optical systems, the above method of collision detection is not very reliable on an optical network. One solution, uses optical receivers and logic circuits at the star to determine when two stations are broadcasting simultaneously, and distributes a collision sensed signal to all stations over the star. In response to the collision sensed signal, the stations terminate broadcasting for random intervals before reinitiating transmission.

The second major approach to eliminating interference between transmissions on a network only permits one station to transmit at a time, with a software token passed between the stations designating the active station.

Due to limitations on the physical size of local area networks imposed by such parameters as propagation time, and on optical networks, limited optical transmitter power and high attenuation, it is desirable in some instances to interconnect two or more networks. In addition, Optical LANs are preferred for use in many instrumentation applications, such as for example the protection and control systems for nuclear reactors. The primary reason for the use of optical LANs in such applications is the electrical isolation and the freedom from electromagnetic interference inherent in the dielectric nature of the interconnecting glass fibers. Optical transmitters and receivers, however, are more expensive than electrical transmitters and receivers, and therefore it would be desirable to be able to interconnect electrically those LAN nodes not requiring the electrical isolation or freedom from interference available with the optical channel.

Accordingly, it is a primary object of the invention to provide apparatus which can interface optical and electrical nodes in a local area network.

It is another object of the invention to provide apparatus which can function as an expander to increase the number of optical or electrical LANs nodes in a network.

It is another object of the invention to provide apparatus which can interface optical and electrical LANs.

It is still another object of the invention to provide the above apparatus which allows bi-directional signal transmission between all the devices and channels connected to the apparatus while preventing endless messages repetition and interference.

It is yet another object of the invention to provide a versatile interface module which can satisfy the above objects and can interface LAN controllers to either or both optical or electrical LANs.

SUMMARY OF THE INVENTION

These and other objects are realized by the present invention which is directed to a dual media local area network which includes an electrical local area network interface and an optical local area network interface each having transmitter ports to which a signal to be transmitted on the associated network is applied and a receiver port at which a signal received from the associated network is presented. The receiver port of each network interface is connected to the transmitter port of the other network interface such that a signal received by an interface from its associated network is retransmitted on the other network. Blocking means connected to each of the network interface receiver ports block signals received from the associated network from being applied to the transmitter port of the other network interface while a signal is being applied to the associated network interface transmitter port, and for a period of time thereafter equal to the worst case propagation delay for the associated network, to prevent endless repetition of a signal.

In one form of the invention, the dual media network interface also includes a controller interface for interfacing electrical and optical local area networks with a communications controller. The controller interface has a transmitter port and a receiver port connected respectively to the transmitter ports and receiver ports of both of the network interfaces, such that a signal applied by a controller to the controller interface is transmitted on both the optical and the electrical networks, and a signal received on either network is broadcast on the other network and is transmitted to a controller connected to the controller interface. A preferred form of the module has two such controller interfaces with their transmitter and receiver ports interconnected as well as being connected to the corresponding ports on the network interfaces to establish bi-directional communications between the controllers and the optical and electrical networks.

The dual media network interface modules can be used to interface electrical and optical nodes in a local area network. They can also be used to expand electrical or optical networks, to interconnect electrical or optical local area networks, and to connect multiple optical networks with multiple electrical networks.

The gate means for blocking received signals during transmission may comprise a retriggerable monostable which has a pulse width equivalent to at least the maximum propagation time for the associated network. Alternatively, the gate means can comprise logic means which is responsive to the first to be generated of a transmit signal to be applied to the transmitter port of the associated network interface and a receive signal generated at the receiver port for inhibiting the other signal for an interval equal at least to the worst case propagation time of the associated network.

The dual media network interface of the invention is a versatile, economical module for interconnecting and expanding optical and electrical local area networks, and in its preferred form it is particularly suitable for instrumentation in which pairs of channels are mounted in a common instrumentation rack or cabinet.

BRIEF DESCRIPTION OF THE DRAWINGS

A full understanding of the invention can be gained from the following description of the preferred embodiments when read in conjunction with the accompanying drawings in which:

FIG. 5 is a schematic diagram of modified form of the dual media network interface disclosed in FIG. 1;

FIG. 6 is a schematic diagram of another modified form of the dual media network interface disclosed in FIG. 1;

FIG. 11 is a schematic diagram of an alternate form of a blocking circuit used in the dual media interface module of the invention;

FIG. 12 is a signal timing diagram for the gates circuit of FIG. 11 in, response to a transmit signal; and FIG. 13 is a signal timing diagram for the gates circuit of FIG. 11 in response to a receive signal.

DESCRIPTION OF THE PREFERRED EMBODIMENTS

Figure 1:
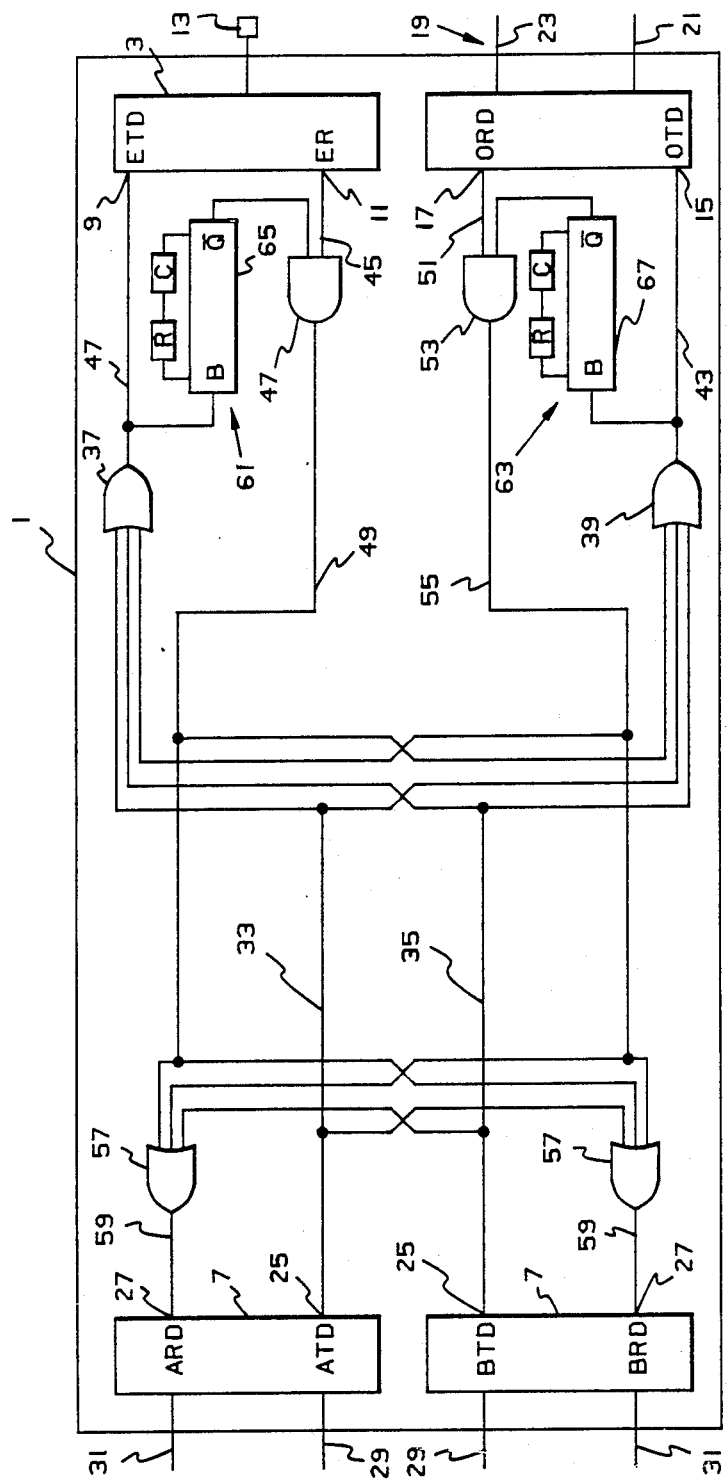
FIG. 1 is a schematic diagram of a dual media local area network interface in accordance with the invention.

FIG. 1 is a functional block diagram of the preferred form of the dual media local area network interface (DMNI) module 1 in accordance with the invention. The DMNI module 1 includes an electrical local area network interface 3, an optical local network interface 5, and two controller interfaces 7. The interface functions so as to allow bi-directional signal transmission between all devices and channels connected to the module; that is, controllers connected to the controller interfaces 7, an electrical LAN connected t the electrical network interface 3, and an optical LAN connected to the optical network interface 5.

The electrical network interface 3 which interfaces with an electrical local area network (ELAN) has a transmitter port 9, labeled ETD, a receiver port 11, label ERD, and a connection 13 for connecting the interface to the coaxial cable of an ELAN. An electrical signal applied to the transmitter port 9 of the module 1 is launched onto the ELAN through the connection 13. A signal received from the ELAN through connection 13 generates a signal at the receiver port 11.

The optical network interface 5 includes a transmitter port 15, labeled OTD, a receiver port 17, labeled ORD, and network connections 19 including an output optical fiber connection 21 and input optical fiber connection 23. An electrical signal applied to the transmitter port 15 launches an optical signal on an optical LAN through connection 21 while optical signals received through connection 23 generate an electrical signal at the receiver port 17.

Each of the controller interfaces 7 has a transmitter port 25, a receiver port 27, an input port 29 and an output port 31. As will be seen below, these controller interfaces 7 generate an isolated electrical signal at the transmitter port 25 in response to an electrical signal applied to the input port 29, and generate an isolated output signal at the output port 31 in response to a signal applied to the receiver port 27. The controller interfaces are connected to microprocessors which control message traffic on the local area networks. Two controller interfaces 7 are provided on the same board with an electrical network interface 3 and an optical network interface 5 to form a module 1 which is particularly adapted for systems which house two network stations in the same cabinet.

The transmitter port 25 of each of the controller interfaces 7 is connected to the transmitter ports 9 and 15 respectively of the electrical network interface 3 and optical network interface 5 through leads 33 and 35 connected to OR gates 37 and 39 which in turn are connected to the ports 9 and 15 respectively by leads 41 and 43. In addition, the receiver port 11 of the electrical network interface 3 is connected to the transmitter port of the optical network interface 5 through lead 45, AND gate 47, and lead 49 connected to the OR gate 39. Similarly, the receiver port 17 of the optical network interface 5 is connected to the transmitter port 9 of the electrical network interface 3 through a lead 51, AND gate 53, and led 55 connected to the OR gate 37. The leads 49 and 55 also connect the receiver ports of the network interfaces 3 and 5 to the receiver ports 27 through gates 57 and leads 59.

In order to preclude endless signal propagation through the LAN's, blocking circuits 61 and 63 are provided to block signals generated at the receiver ports of the electrical network interface 3 and optical network interface 5 while a signal is being applied to the corresponding transmitter port, and for a period of time thereafter corresponding to the worst case propagation time for that network. In the embodiment shown in FIG. 1, these blocking circuits 61 and 63 comprise retriggerable monostables 65 and 67 and the AND gates 47 and 53 respectively. The pulse width of the complemented output of the retriggerable monostables applied to the associated AND gate is selected to be slightly greater than the worst case propagation delay of the corresponding LAN. These pulse widths are set by the resistance and capacitance values of the RC circuit associated with the monostable.

In their preferred form, the DMNI modules 1 are designed for use with LAN's which operate at a 10 Mbps data rate with a Manchester (bi-phase high) line code. This data rate and line code allow the use of IEEE 802.3 Ethernet/Cheapernet interfaces for the electrical portions of the DMNI and the use of "fiberoptic Ethernet" optical receiver and transmitter modules for the optical interfaces.

A Manchester encoded signal to be transmitted on the LAN's originates in an Ethernet communications controller and is received at the corresponding DMNI communications controller interface 7 through its input port 29. The signal is routed from the transmit port 25 of the controller interface to the receive port 27 of the other controller interface 7, and to the transmitter ports 9 and 15 of both the LAN interfaces 3 and 5 respectively where it is launched onto the electrical and optical LAN's.

The signals driving the LAN transmitters are also applied to the inputs of the retriggerable monostables 61 and 63 whose output pulse widths have been chosen to be slightly greater than the worst case propagation delay of the corresponding LAN. Since the output of each monostable is AND'd with the corresponding receiver port output, that receiver output is blocked until after the last bit of the transmitted signal has propagated from the transmitter back to the receiver. At the price of increased dead-time between messages endless signal propagation through the LANs is prevented since a signal received on either LAN is normally rebroadcast on the other as well as being routed to the controller interface receive ports 27.

Manchester encoded signals originating in controllers associated with other DMNI modules 1 are received via the electrical or optical LAN interfaces 3 and 5. Since the local communication controllers are not transmitting, the receiver outputs are not blocked, and the received signal is routed to the receiver ports 27 of the controller interfaces 7 and the transmit port of the adjacent LAN.

Thus, it can be seen that signals from any communications controller will reach every other communications controller by means of either an optical or an electrical LAN or, in the case of the adjacent controller through a logic gate. In addition, the retriggerable monostables 61 and 63 block the electrical network interface 3 or optical network interface 5 receiver port outputs during, and for a period after, any electrical network interface or optical network interface transmission, thus preventing endless signal propagation through the network.

Figure 2:
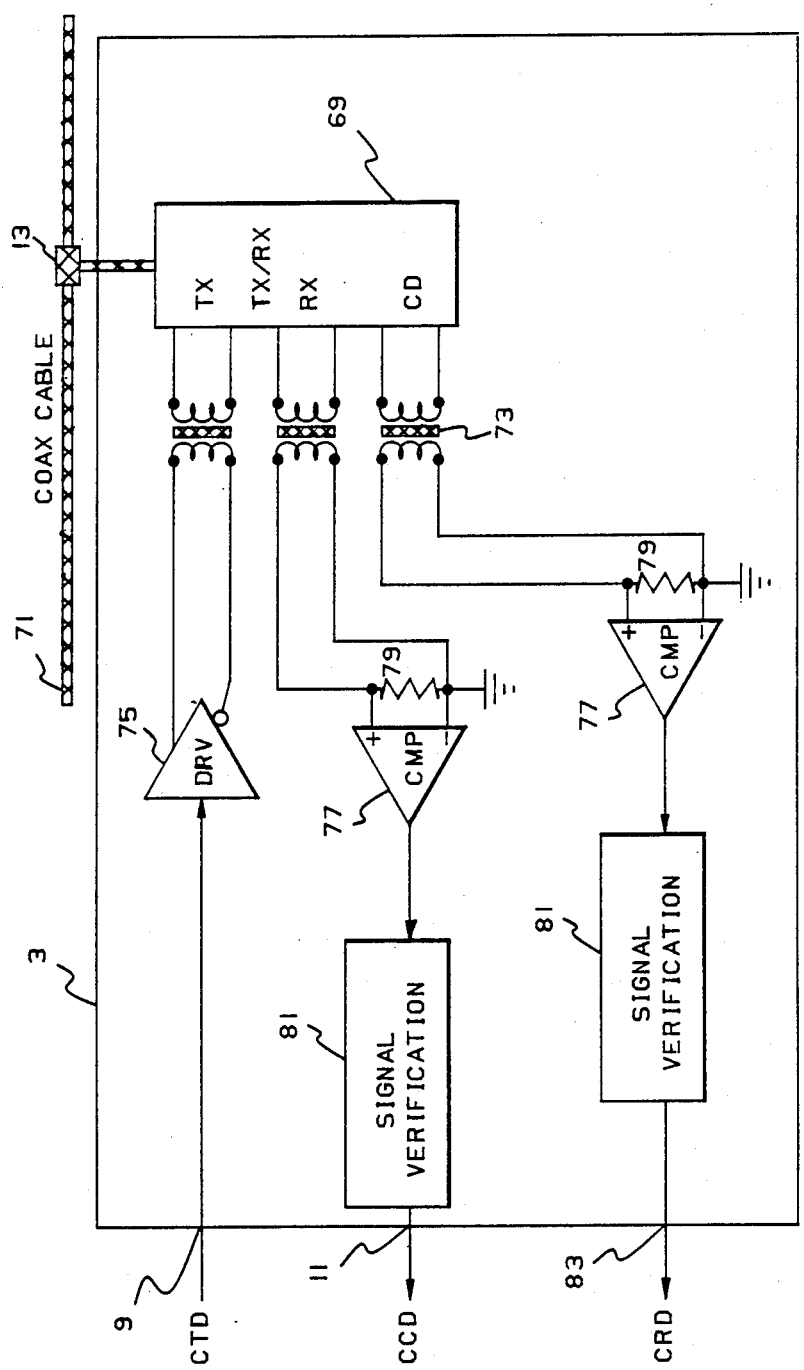
FIG. 2 is a schematic diagram of an electrical network interface which forms a part of the dual media local area network interface of FIG. 1.

FIG. 2 illustrates the details of the electrical network interface 3. The heart of this interface is an integrated circuit transceiver 69 such as the Intel 82502 Ethernet transceiver chip. Present use of the dual media network interfaces of the invention is contemplated in LANs using a token passing access protocol under which controllers always transmit in sequence and simultaneous transmissions from two controllers do not occur. However, with the Intel 82502 integrated circuit transceiver 69, the module will operate in a standard Ethernet environment (electrical LAN only) with attention to maximum network delays as specified in Ethernet specification, IEEE 802.3.

A single coaxial BNC-Tee connector forms the connection 13 to a 50 Ohm coaxial cable segment, terminated at both ends, making up the electrical LAN 71. The transceiver chip 69 contains a cable driver for signal transmission and a receiver for signal reception, both connected between the shield and the coaxial cable center conductor through the BNC-Tee connector 13. The receiver output, RX, the transmitter input, TX, and an internally generated collision detect signal, CD, are coupled to the other DMNI circuits through 1:1 isolation transformers 73. While the collision detect signal is not needed for LANs using a token passing protocol, the signal is available if needed for other access protocols or for use in testing or diagnostics.

Transmit signals received at the transmitter port 9 of the electrical network interface 3 are applied by a driver 75 to the isolation transformer connected to the TX input of the transceiver chip 69. The isolated signals generated from the RX and CD outputs of transceiver chip 69 are passed through puls shapers comprising comparators 77 with their inputs shunted by resistors 79, and are applied to signal verification modules 81 which pass signals of a specified frequency to receiver port 11 and collision signal port 83 respectively.

Figure 3:
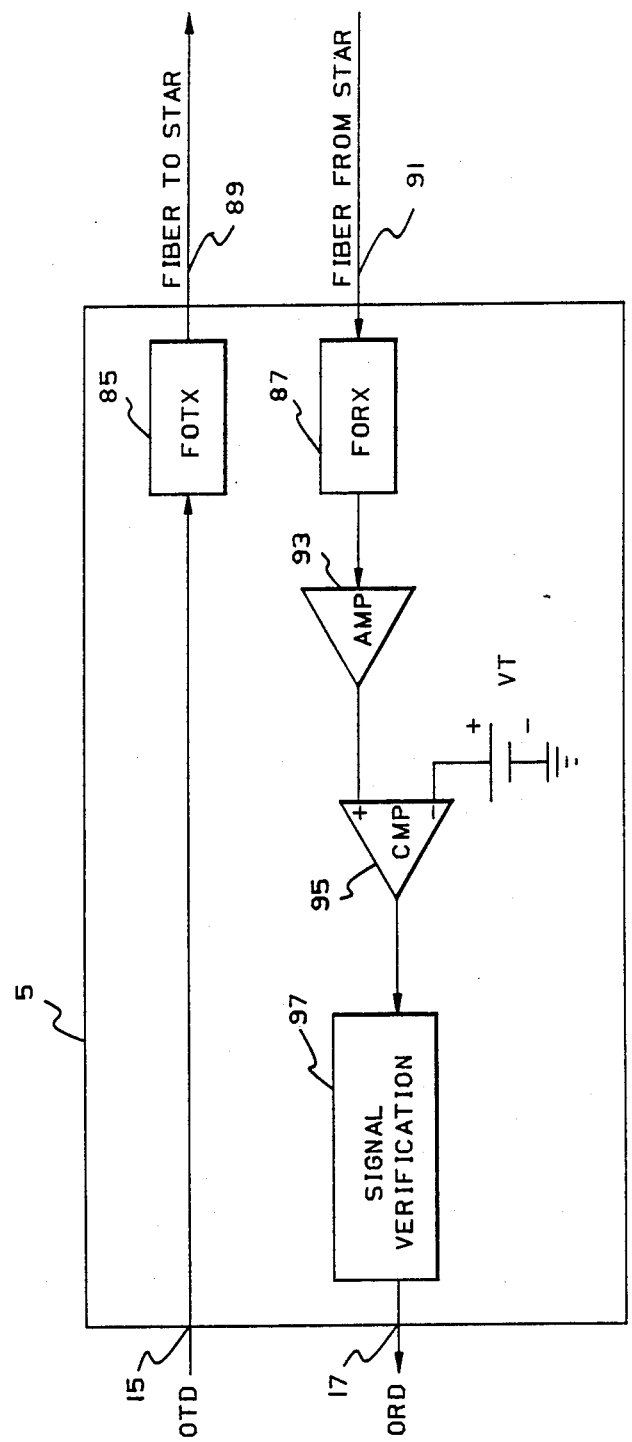
FIG. 3 is a schematic diagram of an optical network interface which forms part of the dual media local area network interface of FIG. 1.

As illustrated in FIG. 3, the optical network interface 5 of the DMNI module 1 consists of an optical transmitter 85 and an optical receiver 87 respectively connected to an input port and an output port of a transmissive star coupler (not shown) of an optical LAN by means of fiber optic cables 89 and 91. The optical transmitter 85 accepts a Manchester encoded signal from one of the two LAN controllers, or from the electrical LAN, and off-on modulates the radiant optical output of an infrared emitting diode with a fiber pigtail terminated in an SMA style connector.

The fiber optical receiver 87 consists of an integrated PinFet module with an attached fiber pigtail terminated in an SMA style connector. The PinFet collects the on-off modulated optical radiant power coupled into the pigtail by the fiber 91 coming from a transmissive star coupler output port (not shown), and converts into a high-low level electrical signal. The sensitivity of the PinFet, together with the transmitter launched power and the overall attenuation in the fiber cables, connectors, and star coupler, determines the number of nodes that can be supported in the optical network. The modulated electrical signal generated by the optical receiver 87 is amplified in amplifier 93 and applied to a pulse shaper in the form of a biased comparator 95. The shaped pulse signal is applied to a signal verification circuit 97 similar to those in the electric interface circuit. The verified signal appears at the receiver port 17 of the optical interface 5.

Figure 4:
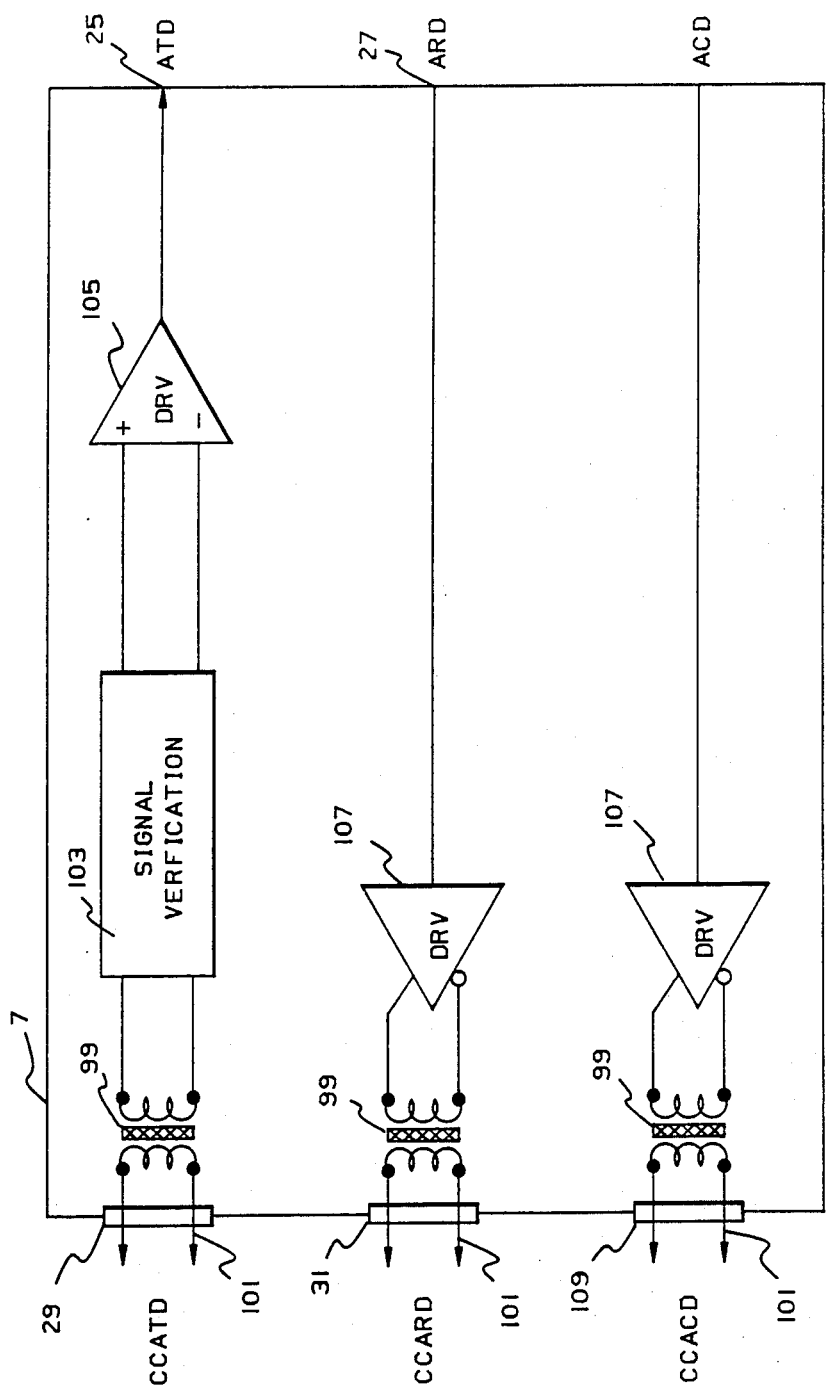
FIG. 4 is a schematic diagram of a controller interface which also forms a part of the dual media local area network interface of FIG. 1.

A schematic diagram of the communications controller interfaces 7 is shown in FIG. 4. Each of the controller interfaces consist of three balanced electrical channels isolated by one to one transformers 99 and brought in on a standard Eithernet transceiver cable and connector 101. The three channels consist of: the controller output signal to be transmitted to other controllers; the controller input signal received from the other controller or over the electrical or optical LAN; and the electrical LAN collision detection signal which is not used in normal operation, but is made available for possible use in testing and diagnostics or other access protocols. The controller output signal is applied through the controller interface input port 29, and after isolation, verification in module 103 and pulse shaping in comparator 105 is presented a transmitter port 25.

Signals from either of the LANs or the other controller interface in the module are received by the controller interface through receiver port 27, and are applied to a driver 107 for the isolation transformer 99 to gen rate the isolated receiver signal at the controller interface output port 31. The collision detection signal is similarly applied to a driver 107 and passed through a transformer 99 for presentation at a collision signal port 09.

FIG. 5 illustrates a modified form of the DMNI 1' for use in interconnecting electrical and optical LANs where there is no need for the controller interfaces. Like components in the module of FIG. 5 are identified by the same reference characters as the corresponding components in the embodiment of FIG. 1. No OR gates are required since only the gated signal from the receiver port of the other network interface is applied to the transmitter ports of the interfaces. Thus, the receiver signal generated at the receiver port 17 of the optical network interface 5 is applied to the transmitter port 9 of the electrical interface 3 through the led 111 from the and gate 53. Similarly the and gate 47 controlling the receive signal generated by the electrical network interface 3 is connected directly to the transmit port 15 of the optical LAN 5 through led 113. With this module 1', signals received on either network are rebroadcast on the other network, but with endless repetition prevented by the blocking circuits 61 and 63.

FIG. 6 illustrates another form of the DMI module 1" in which only one controller interface 7 is provided. Again components corresponding to those in the embodiment of FIG. 1 are identified in FIG. 6 by the same reference characters.

Figure 7:
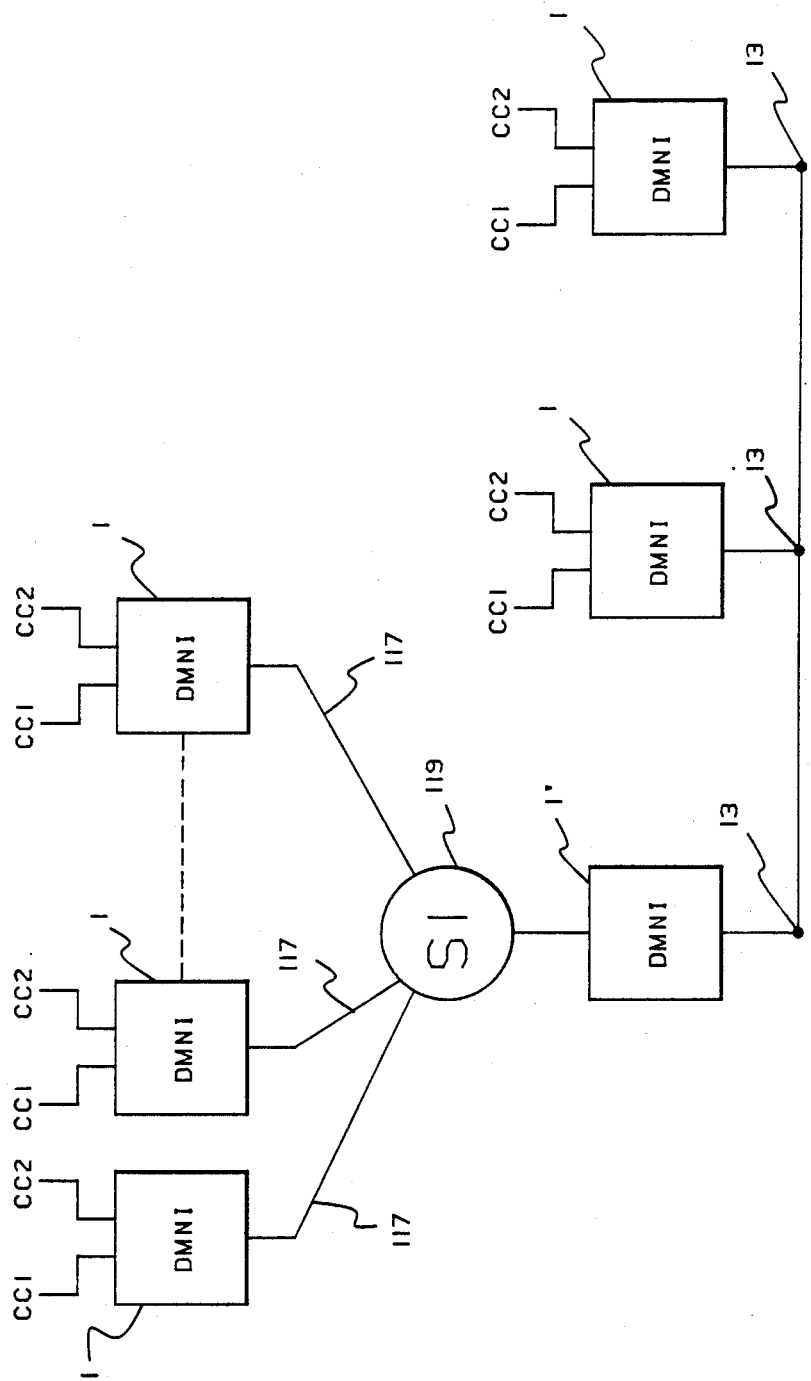
FIG. 7 is a schematic diagram illustrating an arrangement in accordance with the invention of dual media interface modules used to interface electrical and optical nodes in a LAN.

The DMNI modules of the invention are very versatile devices for interconnecting electrical and optical LANs with each other and with controllers which control message traffic on the networks. Combining electrical and optical LAN interfaces in one module allows a LAN to be made up of both electrically coupled nodes and optically coupled nodes as shown in FIG. 7. A number of modules 1 connected by connectors 13 to a coaxial cable 115 form the electrical nodes. One or both of their controller interfaces can be connected to controllers by sets of leads CC1 and CC2. The optical network interfaces in these modules are not used.

Other modules 1 form optical nodes which are connected by sets of transmit and receive optical fiber leads 117 emanating from an optical star coupler 119. Again, one or both of the controller interface electrical leads CC1 and CC2 of each of the modules 1 forming the optical nodes can be connected to communications controllers (not shown). The electrical network interface in these modules are not used.

The electrical and optical networks in FIG. 7 are interconnected by a module 1', or alternatively by a module 1 or 1" in which the controller interfaces are not utilized. With this arrangement, a signal injected by any of the controllers connected to a set of leads CC1 or CC2 will be reproduced on every other set of leads CC1 and CC2 in both the electrical and optical networks. The less expensive electrical medium would be used for the nodes not requiring the electrical isolation and freedom from electromagnetic interface (EMI) available with the optical medium.

Figure 8:
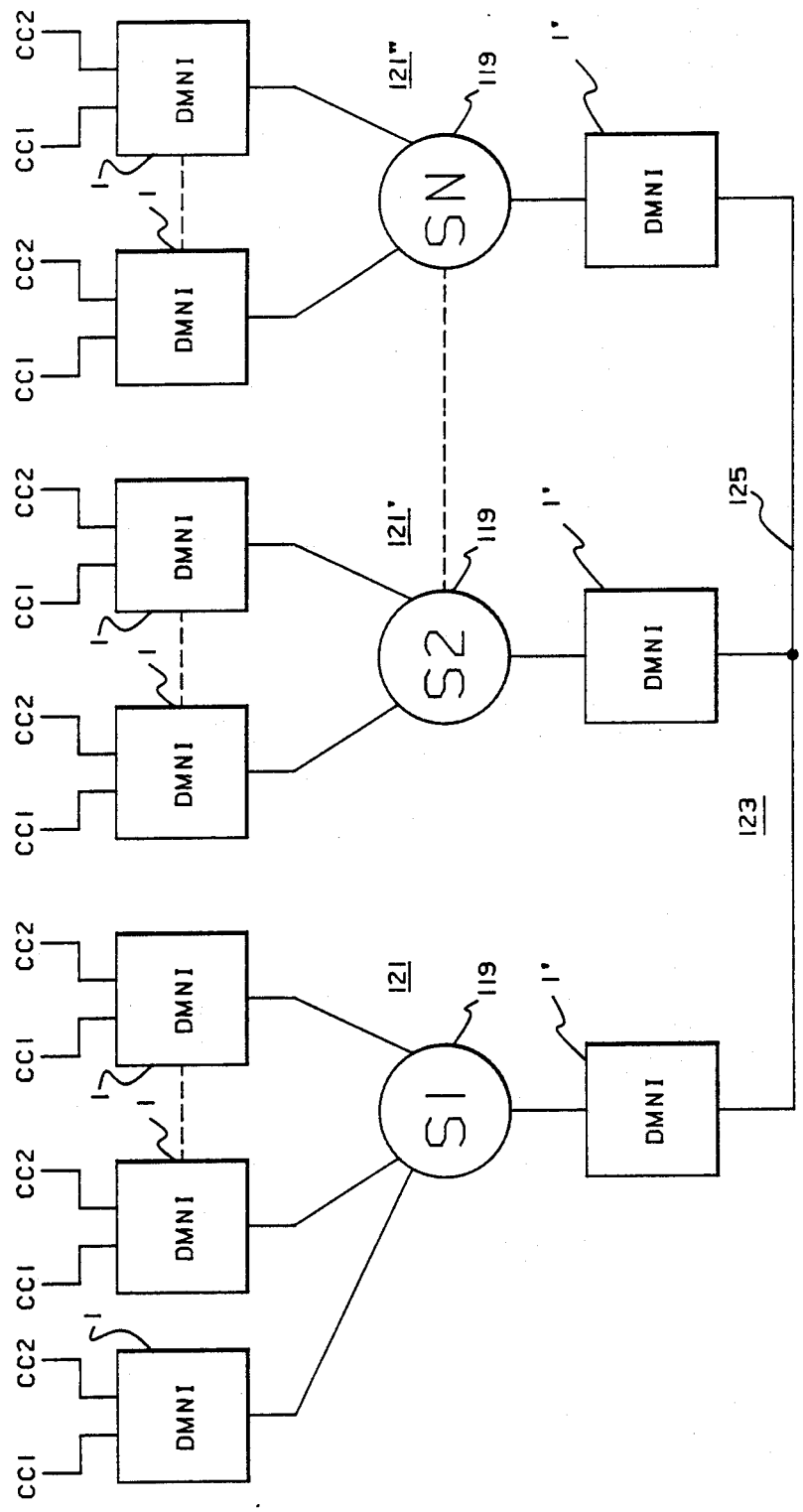
FIG. 8 is a schematic diagram illustrating an arrangement in accordance with the invention of dual media interface modules used to interface multiple optical LANs.

The modules 1, 1' or 1" can also be used to expand, via an electrical LAN 123, an existing optical LAN 121 as shown in FIG. 8. Additional nodes can be added by coupling one or more additional optical star couplers 119 through an electrical LAN 123 which includes the modules 1' connected to a coaxial cable 25. This arrangement is particularly useful because of the limited number of nodes that can be provided on an optical network due to limited optical transmitter power and high transmissive star splitting losses.

Figure 9:
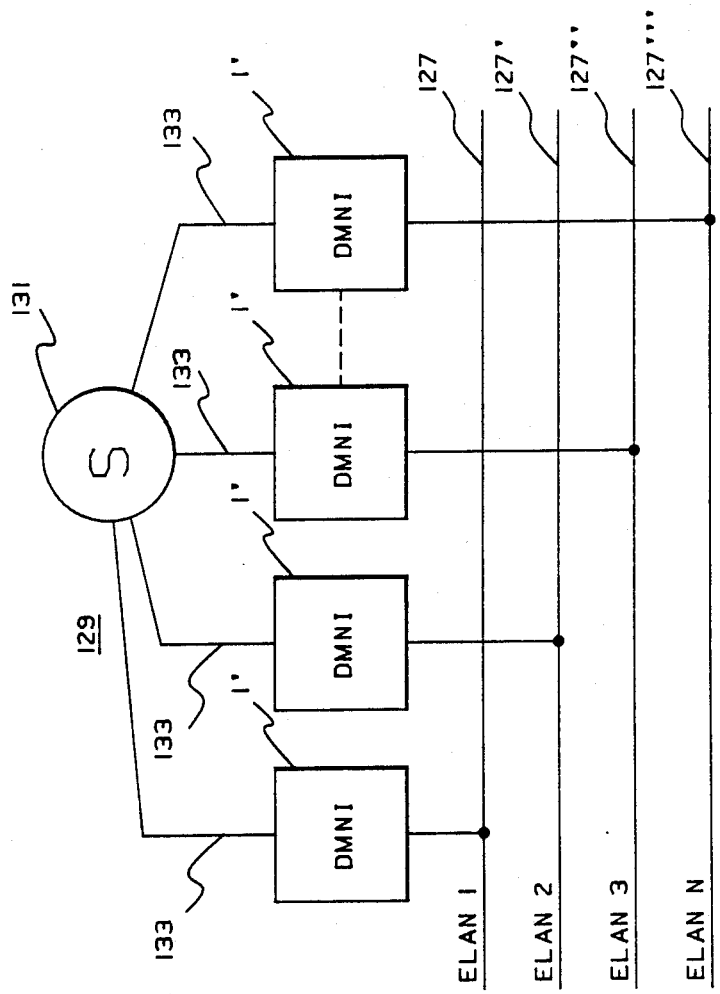
FIG. 9 is a schematic diagram illustrating an arrangement in accordance with the invention of dual media interface modules used to interface multiple electrical LANs.

Similarly, the modules 1, 1' or 1" can be used to interconnect several electrical LANs 127 (ELANs 1 to N) using an optical LAN 129 made up of star coupler 131 and sets of transmit and receive fiber optic leads 133 as shown in FIG. 9.

Figure 10:
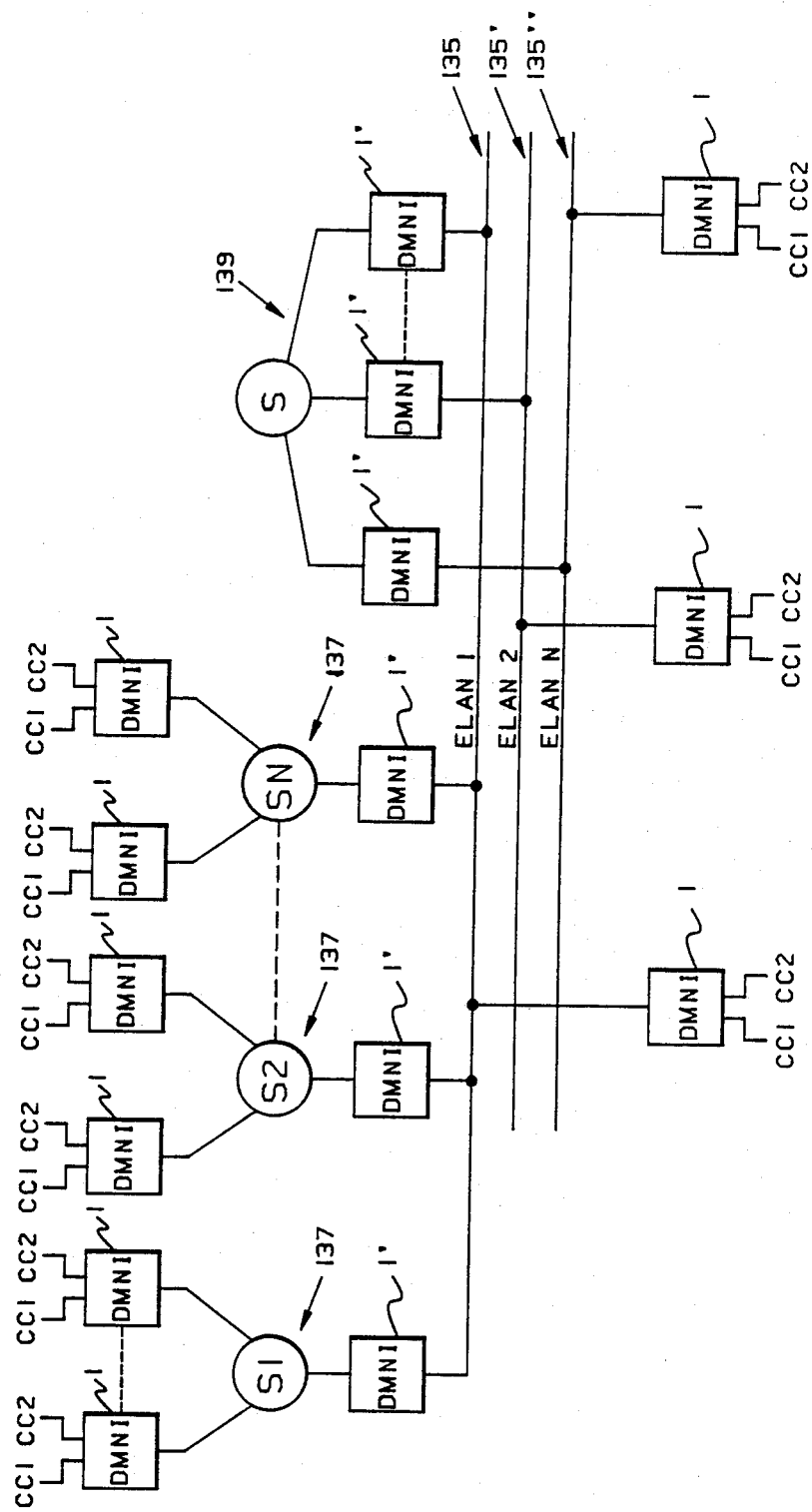
FIG. 10 is a schematic diagram illustrating an arrangement in accordance with the invention of dual media interface modules used to interface multiple optical LANs to multiple electrical LANs.

FIG. 10 illustrates the use of the DMNI modules 1',1" or 1 of the invention to interconnect several electrical LANs 135 (ELAN 1 to N) with several optical LANS 137. While the ELANs are shown connected to each other in FIG. 10 by a dedicated optical LAN 139, it can be appreciated that each of the electrical lands could each be alternatively connected to one of the star couplers in the optical LANs 137 to 137". In fact, those skilled in the art will realize that many other combinations of electrical and optical LANs can easily be arranged using the dual medial network interface modules of the invention.

FIG. 11 illustrates an alternate form of a blocking circuit 63' for the optical network interface 5, to prevent reflections in the optical LAN from generating endless repetitions of a transmitted signal. The blocking circuit 63' provides positive lock out of the transmitter as well as the receiver. A transmitter signal detector module 139 generates a transmitter signal detect signal in response to a transmit signal on lead 43. This transmitter detect signal is applied to both an inhibit transmit module 141 and an inhibit receive module 143. Similarly, a receiver detector module 145 generates a receiver detect signal in response to a signal generated at the receiver port 17 of optical network interface 5 and applies this signal to both the inhibit receive module 143 and the inhibit transmit module 141. A permit transmit signal generated by the permit transmit module controls an AND gate 147 which gates the transmit signal on lead 43 to the transmit port 15 of the optical network interface 5 for transmission on an optical LAN, while a permit receive signal generated by the inhibit receive module 143 controls an AND gate 149 which gates a received signal generated at the receiver port 17 to lead 49.

The transmitter detect signal operates the module 141 to enable the AND gate 147 to pass the transmit signal to the transmit port 15 of optical network interface 5 and operates the module 143 to disable AND gate 149 to block incoming signals at the receiver port 17 of network interface 5. The receiver detect signal, on the other hand, enables gate 149 through inhibit receive module 113 and disables gate 147 through module 141 to block transmit signals from reaching the transmitter port of optical network interface 5. In order to eliminate conflict, a clock generator 151 applies clock pulses to both modules 141 and 143. As can be seen from the waveform diagram of FIG. 12, the transmitter (OTD) detect signal operates on one edge of the clock signal while as seen in FIG. 13, the receive (ORD) detect signal operates on the other pulse edge. The first signal applied t the modules 141 and 143 locks them in the appropriate state until the data signal is interrupted. It should be noticed from FIGS. 12 and 13, that in the quiesent state, both the transmit and receive channels are blocked. The detection of a data signal in either transmit or receive will unblock that signal, and inhibit any operation of the module 141 or 143 by the other.

While specific embodiments of the invention have been described in detail, it will be appreciated by those skilled in the art that various modifications and alternatives to those details could be developed in light of the overall teachings of the disclosure. Accordingly, the particular arrangements disclosed ar meant to be illustrative only and not limiting as to the scope of the invention which is to be given the full breadth of the appended claims and any and all equivalents thereof.

What is claimed is:

1. A dual media network interface module for use with electrical and optical local area networks comprising:

an electrical local area network interface having a transmitter port and a receiver port, connection means for connecting the interface to an electrical local area network, and means for transmitting an electrical signal applied to the transmitter port on the electrical local area network and for presenting a signal received from the electrical local area network at the receiver port;

an optical local area network interface having an electrical transmitter port and an electrical receiver port, connection means for connecting the interface to an optical local area network, and means for launching an optical signal on the optical local area network in response to an electrical signal applied to the transmitter port, and for converting an optical signal received from the optical local area network to an electrical signal for presentation at the receiver port;

means for connecting the receiver port of each network interface to the transmitter port of the other network interface such that a signal received by an interface from the network to which it is connected is retransmitted on the other network; and blocking means associated with each of the network interfaces and connected to the receiver port thereof, each blocking means having a control lead connected to the transmitter port of the associated network interface to block signals received from the associated network from being applied to the transmitter port of the other network interface while a signal is being applied to the transmitter port of the associated network interface and for a period of time thereafter equal to the worst case propagation delay for the associated network.

2. The module of claim 1 in combination with an electrical area network connected to the connection means of the electrical network interface and an optical local area network connected to the connection means of the optical local area network interface.

3. The combination of claim 2 including additional of said dual media network interface modules, each of said additional dual media network interface modules having a selected one of its electrical local area network interface connection means and its optical local area network interface connection means connected to an appropriate one of said local area networks, each additional module further including a controller interface having a transmitter port, a receiver port, an input port and an output port, means connecting the transmitter port of the controller interface to the transmitter port of each of the network interfaces, and means connecting the receiver port of the controller interface to the blocking means at the receiver port of each of the network interfaces, such that an external signal applied at the input port of the controller interface is broadcast on both the electrical area network and the optical area network and signals received on either of the networks is presented at the output port of the controller interface.

4. The combination of claim 2 including a plurality of electrical local area networks, optical coupler means having a plurality of optical leads, and a plurality of said dual media network interface modules, one associated with each of said electrical local area networks and each having its electrical network interface connection means connected to the associated electrical local area network and having its optical network interface connected to one of the optical leads connected to the optical coupler, such that a signal transmitted on any of the electrical local area networks is broadcast on each of the other electrical area networks yet the networks are electrically isolated from one another.

5. The combination of claim 2 including a plurality of optical local area networks, a plurality of said dual media network interface modules, one associated with each optical local area network and each having its optical interface connection means connected to the associated optical local area network, and electrical connection means interconnecting the electrical network interface connection means for each of said dual media network interface modules, such that a signal broadcast on any of the optical local area networks is broadcast on each of the other optical local area networks.

6. The combination of claim 2 including a plurality of electrical local area networks, a plurality of optical local area networks, and a plurality of said dual media network interface modules each having their electrical network interface connection means connected to an electrical local area network and having their optical network interface connection means connected to an optical local area network such that all of said optical and electrical local area networks are interconnected and a signal transmitted on any of the local area networks is broadcast on each of the other local area networks.

7. The combination of claim 6 including additional dual media network interface modules, each of said additional dual media network interface modules having a selected one of its electrical local area network interface connection means and its optical local area network interface connection means connected to an appropriate one of said local area networks, each of said additional modules including a controller interface having a transmitter port, a receiver port, and an input port and an output port, means connecting the transmitter port of said controller interface to the transmitter port of each of the network interfaces of the module, and means connecting the receiver port of the controller interface to the blocking means at the receiver port of each of the network interfaces of the module, such that a signal applied to the input port of any of the additional modules appears at the output port of each of the other additional modules.

8. The combination of claim 2 including multiple electrical local area networks, multiple optical local area networks, an optical coupler having a plurality of optical leads, a first set of said dual media network interface module including one such module for each electrical local area network and having its electrical network interface connection means connected to an associated electrical local area network and having its optical network interface connection means connected to one of the optical leads of said optical coupler, and a second set of said dual media network interface modules including one such module for each optical local area network and having its optical network interface connection means connected to the associated optical local area network and having its electrical network interface connection means connected to one of the electrical local area networks.

9. The combination of claim 8 including a plurality of additional modules, each of said additional dual media network interface modules having a selected one of its electrical local area network interface connection means and its optical local area network interface connection means connected to an appropriate one of said local area networks, each additional module including at least one controller interface having a transmitter port, a receiver port, an input port, and an output port, means connecting the transmitter ports of said controller interface of each of the transmitter ports of the network interfaces of the module, and means connecting the receiver port of the controller interface to the blocking means at the receiver port of each of the network interfaces of the module, such that an external signal applied to the input port of any of the additional modules appears that the output port of each of the other additional modules.

10. The dual media network interface module of claim 1 wherein said blocking means comprises a retriggerable monostable having a pulse width equal at least to the worst case propagation time of the network associated with the network interface receiver port to which the blocking means is connected.

11. The dual medial network interface module of claim 1 wherein each said blocking means comprises logic means responsive to the first to be generated of a transmits signal to be applied to the transmitter port of the associated network interface and a receive signal at the receiver port of the associated network interface for inhibiting the other signal for an interval equal at least to the worst case propagation time of the associated network.

12. A dual media network interface module comprising:
- an electrical local area network interface having transmitter and receiver ports, connection means for connecting the interface to an electrical local area network, and means for transmitting an electrical signal applied to the transmitter port on the electrical network and for presenting a signal received from the electrical network at the receiver port;
- an optical local area network interface having electrical transmitter and receiver ports, connection means for connecting the interface to an optical local area network, and means for launching an optical signal on an optical local area network in response to an electrical signal applied to the transmitter port, and for converting an optical signal received from the optical local area network to an electrical signal for presentation at the receiver port;
- a pair of controller interfaces each having a transmitter port, a receiver port and an input port, and an output port;
- means connecting the transmitter port of each of the controller interfaces to the transmitter ports of each of the network interfaces;
- means connecting the receiver port of each network interface to the transmitter port of the other network interface and to the receiver port of each of the controller interfaces; and
- blocking means connected to the receiver ports of the network interfaces and each having a control lead connected to the transmitter port of the associated network interface to block signals received from an associated network from being applied to the transmitter port of the other network interface and to the receiver ports of the controller interfaces while a signal is being applied to the associated transmitter port and for a period of time thereafter equal to the worst case propagation delay for the associated local area network.

* * * * *